United States Patent
Diniz (10) Patent No.: US 8,075,041 B2
(45) Date of Patent: Dec. 13, 2011

(54) DEVICE FOR QUICK MOUNTING OF A TRUCK TOP OR EQUIPMENT ON AN UTILITY VEHICLE

(76) Inventor: Marlon Melo Diniz, Porto Alegre (BR)

(*) Notice: Subject to any disclaimer, the term of this patent is extended or adjusted under 35 U.S.C. 154(b) by 0 days.

(21) Appl. No.: 12/783,537

(22) Filed: May 19, 2010

(65) Prior Publication Data
US 2010/0314897 A1 Dec. 16, 2010

Related U.S. Application Data

(63) Continuation of application No. PCT/BR2008/000369, filed on Nov. 28, 2008.

(51) Int. Cl.
*B60P 7/00* (2006.01)
(52) U.S. Cl. ...... 296/100.01; 296/10; 296/32; 296/35.3; 296/100.04; 296/100.07
(58) Field of Classification Search .............. 296/3, 164, 296/167, 36, 37.6, 100.01, 100.04, 100.17, 296/10, 32, 156, 158, 26.04, 193.12, 35.1, 296/35.3, 100.07, 136.01, 136.03, 136.04; 224/405, 485, 403, 511, 547, 556, 558
See application file for complete search history.

(56) References Cited

U.S. PATENT DOCUMENTS

| | | | | |
|---|---|---|---|---|
| 4,199,188 A * | 4/1980 | Albrecht et al. | ......... | 296/100.04 |
| 4,444,427 A * | 4/1984 | Martin | ............. | 296/43 |
| 4,648,649 A * | 3/1987 | Beal | ............. | 296/156 |
| 4,815,787 A * | 3/1989 | Hale | ............. | 296/167 |
| 4,842,326 A * | 6/1989 | DiVito | ............. | 296/193.04 |
| 5,052,739 A * | 10/1991 | Irwin | ............. | 296/37.6 |
| 5,277,471 A * | 1/1994 | Thibault | ............. | 296/167 |
| 5,584,521 A * | 12/1996 | Hathaway et al. | ............. | 296/36 |
| 6,325,439 B1 * | 12/2001 | Crossman | ............. | 296/37.6 |
| 7,628,442 B1 * | 12/2009 | Spencer et al. | ............. | 296/100.07 |

OTHER PUBLICATIONS

International Search Report for PCT/BR2008/000369, Mar. 23, 2009.

* cited by examiner

*Primary Examiner* — Glenn Dayoan
*Assistant Examiner* — Gregory Blankenship
(74) *Attorney, Agent, or Firm* — Patent Law Agency, LLC; Peter Ganjian (57) ABSTRACT

An improved device for attaching a truck top or appliance fitted with an angle on its base, which rests on a profile attached to the top of the side walls of the vehicle bed and standby parts for coupling to accessories to be used, thus making possible the installation and removal thereof.

5 Claims, 12 Drawing Sheets

DEVICE FOR QUICK MOUNTING OF A TRUCK TOP OR EQUIPMENT ON AN UTILITY VEHICLE

CROSS-REFERENCE TO RELATED APPLICATIONS

This Application is a CONTINUATION application claiming the benefit of priority of the co-pending International Patent Application No. PCT/BR2008/000369 with an international filing date of 28 Nov. 2008 that designated the United States, which claims the benefit of priority of BRAZIL Patent Application No. PI0704802-5, filed 30 Nov. 2007, the entire disclosures of all Applications are expressly incorporated by reference in their entirety herein.

The present invention concerns an improvement developed in a device for mounting a truck top or equipment which is equipped with an iron angle on its base, which rests on a profile attached to the leg of the side walls of the utility vehicle bed and also having an innovative retaining mechanism.

Utility vehicles, particularly light trucks and pickup trucks, have an uncovered truck bed and a tailgate, and they are mainly employed for carrying lighter and less bulky loads. In some cases, the owner may attach to the truck bed a truck top of the same height as the cabin, in order to protect the load during transportation.

However, in some special situations it may be in the driver's interest to remove the truck top or equipment in order to carry a larger load or, simply, for aesthetic or aerodynamic interest. Thus, the removal of the truck top or equipment from the utility vehicle and its corresponding re-placement takes time and effort, and it is not possible to move it quickly and comfortably.

Within the scope of this invention, truck top or equipment mean any framework mounted on the truck bed, such as, covers, shells (metal truck bed cover with a backdoor), ladder rack, swivel ladder, compartmented framework for carrying gas bottles or other large volume containers, mini-camper (special shell for camping), framework for transporting glass panels, lumber or metal profiles, framework especially made for advertising purposes, military application equipment, shell for food commerce.

A proposal for solving this problem is presented in the patent document BR PI 0602255-3, from the same applicant, which proposes a device for mounting the truck top and/or equipment on the utility vehicle by means of a sliding motion and a later engage into the automotive lock coupling system. The device comprises:

a lower profile, adequately fastened to the leg of the side panels of the conventional bed of the utility vehicle, being the profile equipped with a roller located at its entry end, two lower slits, one in the back on a ramp for engaging of the roller from the upper profile and other in the front with an automotive lock which receives the locking pin from the upper profile of the truck top;

an upper profile, adequately fastened under the base of the truck top of the equipment to be mounted on the truck bed, wherein the profile is equipped with a back roller for the sliding motion, a locking pin that engages into the automotive lock, a front ramp for engaging the roller from the lower profile and an orifice coinciding with the one on the lower profile for the application of a padlock.

However, that known device requires effort for accomplishing the sliding motion of the truck top on the track fastened to the top of the truck bed side wall so that the engageting of the automotive locks will take place. A second inconvenience of that device is its complexity since it employs rollers and automotive locks, which renders the mounting operation rather unpractical and the non-competitive price of the device.

Therefore, the object of the present invention is to improve the device for quick mounting of a truck top or equipment on utility vehicles that will effectively overcome the limitations and inconveniences found in the state of the art. The device of the invention comprises:

a lower straight iron angle, which is adequately fastened over the leg of the side walls of the utility vehicle bed, wherein the iron angle is equipped, at one end, with a quick connect with a ring and, at the opposite end, a pin, these components are situated on the vertical wall of the iron angle;

an upper straight iron angle, adequately fastened under the base of the truck top or equipment, which is equipped, at one end, with a cut, and at the opposite end, a slit where the hook engages, these components are also positioned on the vertical wall of the iron angle;

the mounting occurs by simple support of the truck top on the truck bed, followed by a short sliding motion, causing the cut on the upper iron angle to involve the pin on the lower iron angle and a final motion fastening the quick connect on the lower iron angle, so that its ring will engage the hook on the upper iron angle causing the truck top to be firmly secure on the truck bed.

Alternatively, the iron angles may be set apart, i.e., a front section and a back section that coincide, in such a way as to ensure direct support between them.

One other option of the device is the replacement of the cut located at one end of the upper iron angle with a second hook and the replacement of the corresponding pin on the lower iron angle with a second quick connect, in such a way as the upper iron angle is fastened to the lower one by means of two quick connects located at the iron angle ends.

One more option of the device is the replacement of the quick connects with a longitudinal axle, placed along the lower iron angle, that rotates a fraction of a turn by the action of a lever, causing the rings fastened to the eccentrics existing on the shaft to couple with the hooks on the upper iron angle, fastening the truck top to the truck bed.

The improvement of the device for quick mounting of a truck top or equipment on a utility vehicle bed, object of the present invention, brings about the following advantages over the previously known system:

simplicity of the system, that is made of only two iron angles, one fastened to the truck bed and other fastened to the truck top; both pieces of iron angle are straight and continuous, i.e., free from ramps and slits;

employment of a retaining system consisting of ring and hook, dispensing the complex and onerous automotive locks;

device equipped with a simplified command operated by means of a quick connect or lever;

the device does not require rollers and the effort to slide the truck top along the lower iron angle in order to fasten it.

Figure 1:
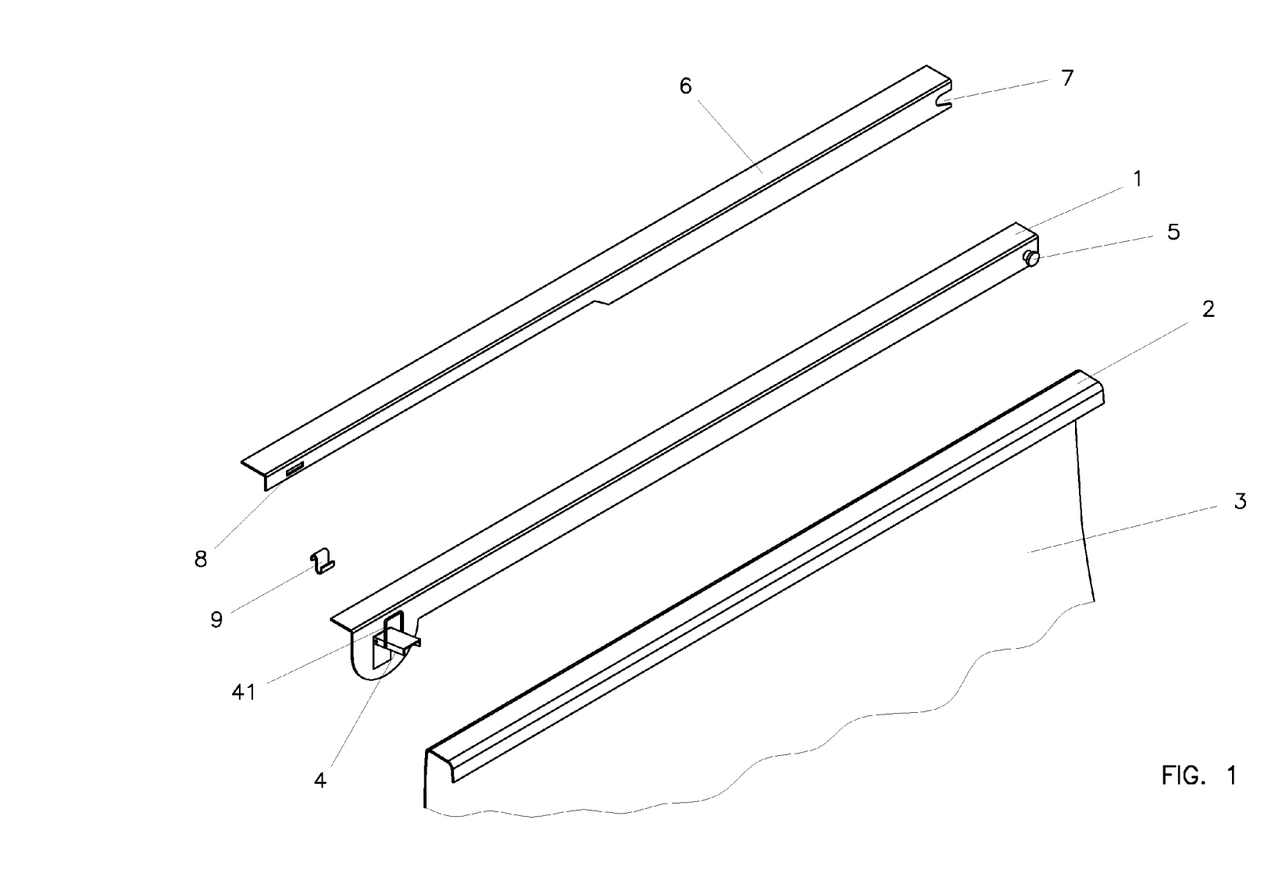
FIG. 1—exploded perspective of the device, viewed from the inside of the truck bed.
Figure 2:
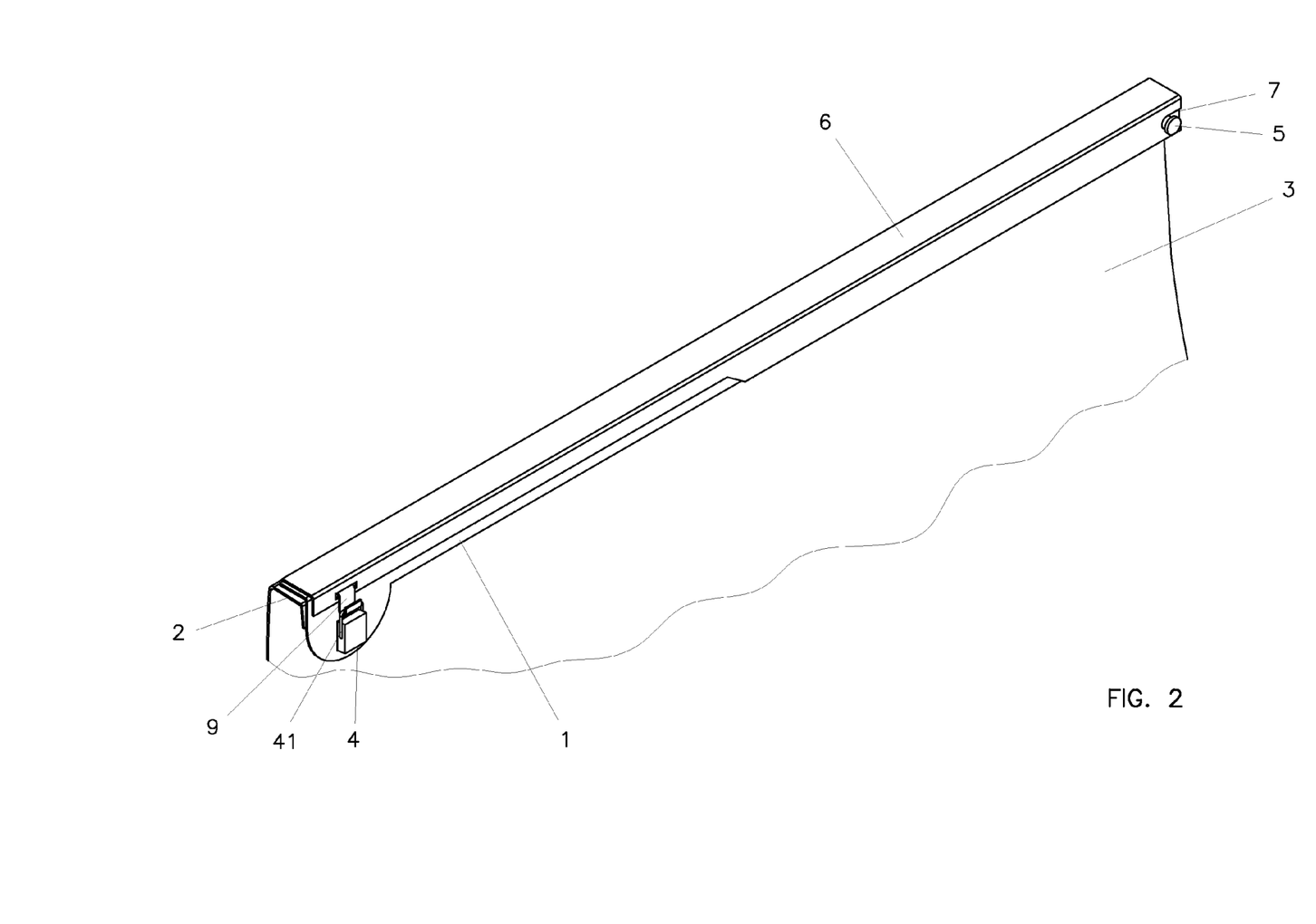
FIG. 2—perspective of the mounted device.

The improvement of the device for quick mounting of a truck top or equipment on a utility vehicle bed, proposed by the invention, may be better understood by means of the following thorough description, which is based on the attached drawings, listed below, which show the preferred achievements of the device, which must not be considered as limitative of this invention:

FIGS. 1 and 2 show the device for quick mounting of a truck top or equipment on utility vehicle beds, which comprises:

a lower straight iron angle (1), which is adequately fastened on the leg (2) of the side walls of the utility vehicle bed (3), wherein the vertical wall of the iron angle is equipped, at one end, with a quick connect (4) with a ring (41) and, at the opposite end, with a pin (5);

an upper straight iron angle (6), adequately fastened under the base of the truck top, wherein the vertical wall of the iron angle is equipped, at one end, with a cut (7) and, at the opposite end, with a slit (8) where the hook (9) engages.

The mounting occurs by simply resting the truck top or the equipment over the utility vehicle bed, followed by a short sliding motion which causes the pin (5) on the lower iron angle (1) to be involved by the cut (7) on the upper iron angle (6) and the final actuation of the quick connect (4), in such a way as its ring (41) will engage the hook (9) on the upper iron angle (6).

Figure 3:
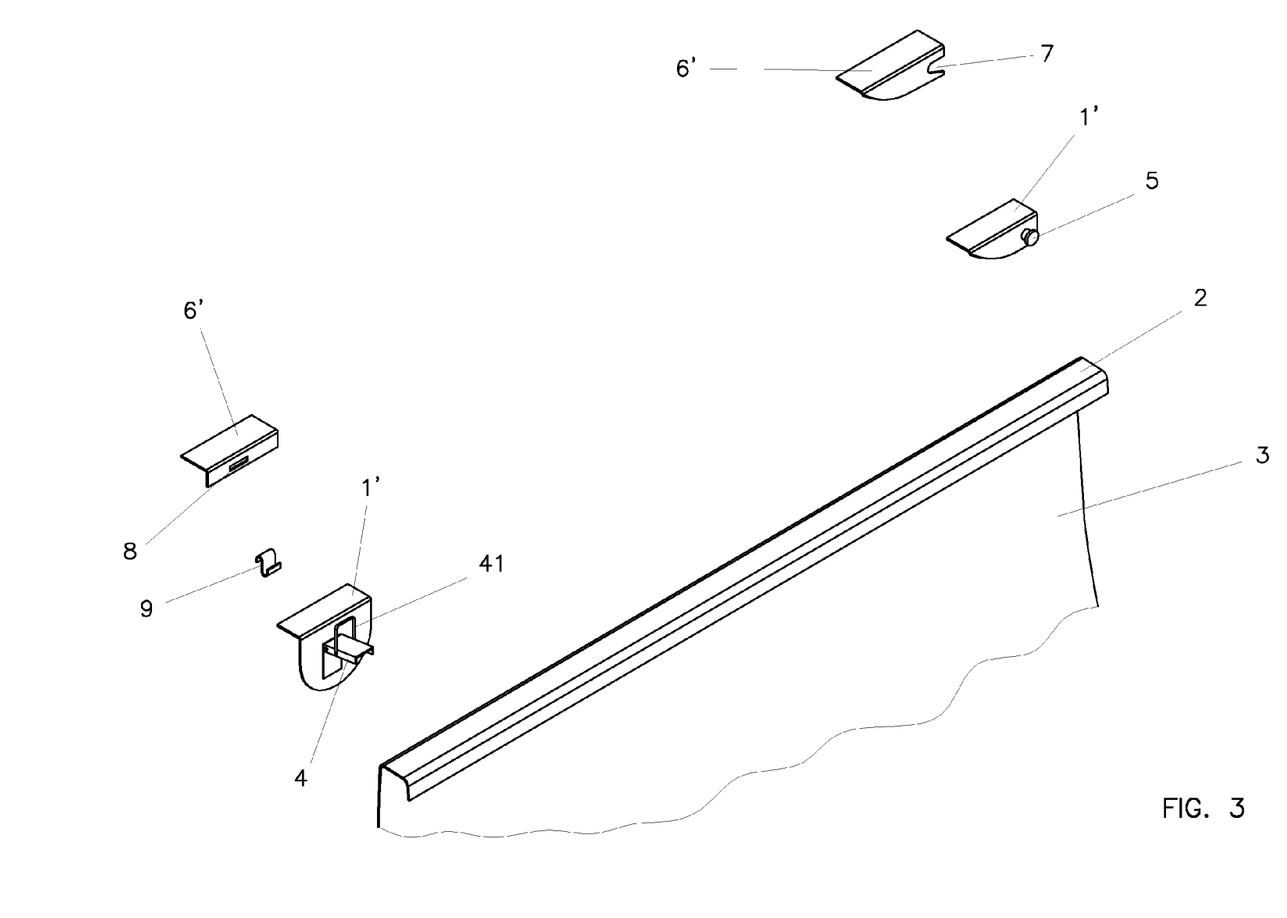
FIG. 3—exploded perspective of a first constructive option of the device with the iron angles sectioned.

FIG. 3 shows a constructive option of the device for quick mounting of truck top or equipment on utility vehicle bed, wherein the lower (1') and upper iron angles (6') are segmented, one part located on the front portion and other part located on the back portion of the leg (2) of the truck bed wall (3). The mounting operation is the same as described hereinbefore.

Figure 4:
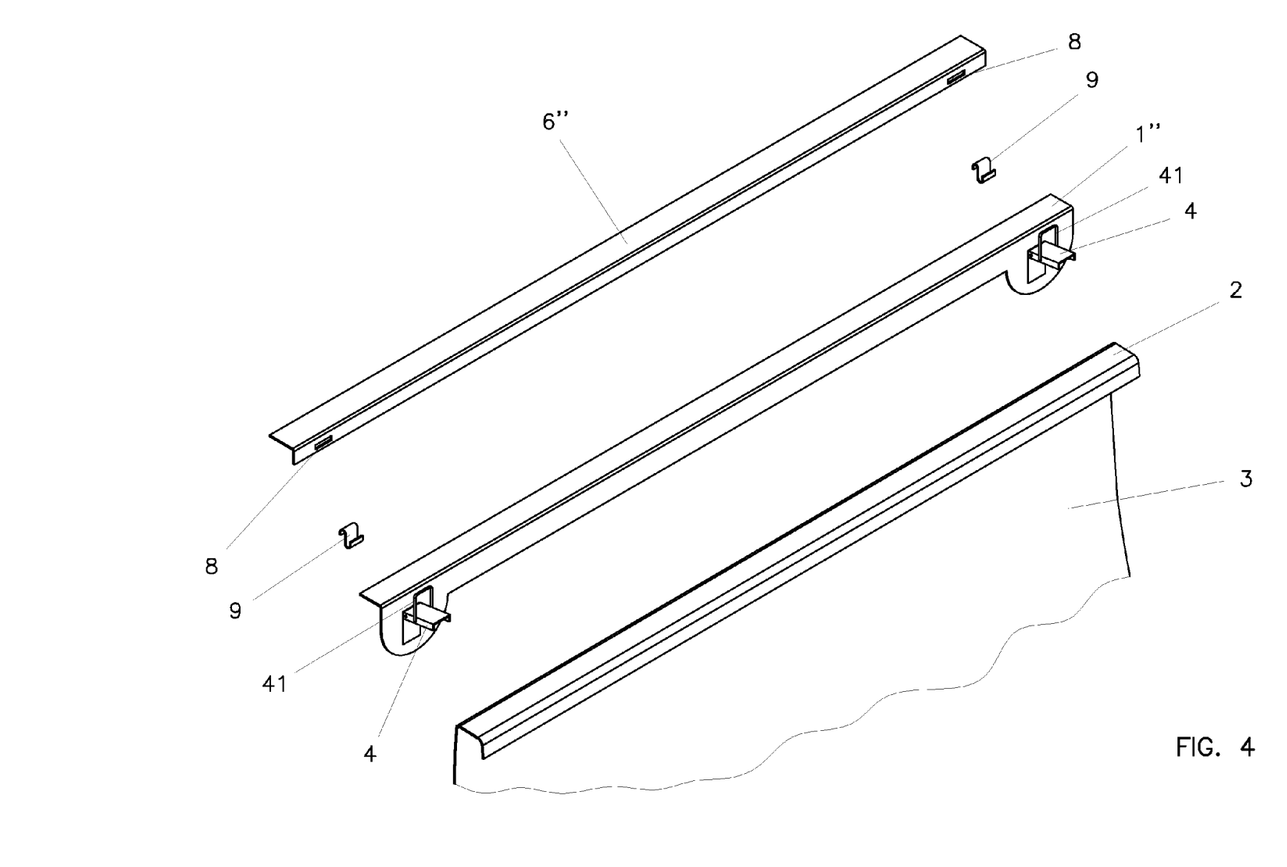
FIG. 4—exploded perspective of a second option of the device with the iron angles uncut and two quick connects.

FIG. 4 shows another constructive option of the improved device for quick mounting of a truck top or equipment on utility vehicle bed comprising:

a lower straight iron angle (1"), which is adequately fastened to the leg (2) of the side walls of the utility vehicle bed (3), wherein the vertical wall of the iron angle is equipped with quick connects (4) with rings (41) at their ends;

an upper straight iron angle (6"), adequately fastened under the base of the truck top or equipment, wherein the vertical wall of the iron angle is equipped with slits (8) to engage hooks (9).

Figure 5:
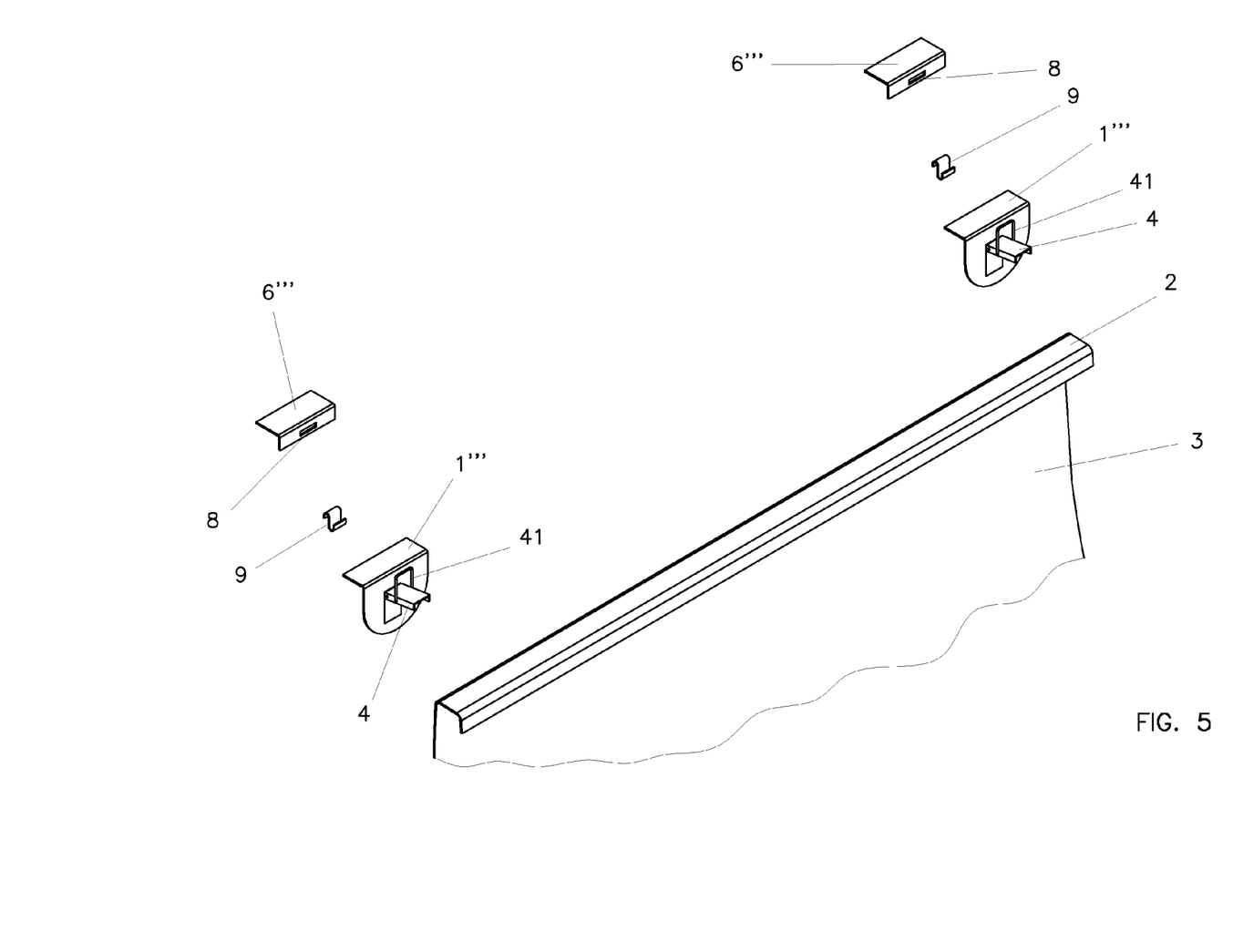
FIG. 5—exploded perspective of the option of the device in FIG. 4, but with the iron angles sectioned.

FIG. 5 shows a variant constructive option of the device for quick mounting of a truck top or equipment on utility vehicle bed shown in FIG. 4, whose lower iron angle (1''') and upper iron angle (6''') have the same coupling system, but the said iron angles (1" and 6''') are segmented, one part thereof is located on the front portion and the other part on the back portion of the leg (2) of the truck bed wall (3).

FIGS. 6 through 9 show another constructive option of the device for quick mounting of a truck top or equipment on utility vehicle bed comprising:

a lower straight profile (10), with an "M" shaped cross section, i.e., a double iron angle, wherein the horizontal leg of the lower iron angle (101) is orthogonally joined to the vertical leg of the upper iron angle (102), and the profile (10) is adequately fastened on the leg (2) of the side wall of the utility vehicle bed (3) by its upper iron angle (102) wherein the lower iron angle (101) has "U" shaped slits (11) set apart;

an upper straight iron angle (6"), adequately fastened under the base of the truck top or equipment, which has slits (8) on the vertical wall to engage the hooks (9);

a mechanism for securing the truck top or equipment which comprises a longitudinal shaft (12) equipped with bearings (13) located under the lower iron angle (101) of the lower profile (10), which rotates a fraction of a turn by the action of a gear box (14) operated by a lever (15), causing the rings (16) of the eccentrics (17) to travel along the slits (11) on the lower profile (10) and couple with the hooks (9) on the upper iron angle (6"), thus securing the truck top to the truck bed.

The gear box (14) may be any mechanism that multiplies the turn of the lever (15) from a fraction of a turn to a greater fraction of a turn of the shaft (12). This turning mechanism may be a couple of gears, spindle and screw, rack and pinion, gears and belt, gears and chain, among other things.

In order to the lever (15) will not hinder circulation inside of the truck bed, it is equipped with an adequate articulation system (19), which enables the lever to withdraw against the lower profile (10) when not in use.

Although the drawings show levers that move along a vertical plane, optionally, the lever may be of a type that moves along a horizontal plane, withdrawing against the lower profile (10) when the mechanism is retaining the truck top or equipment.

Figure 10:
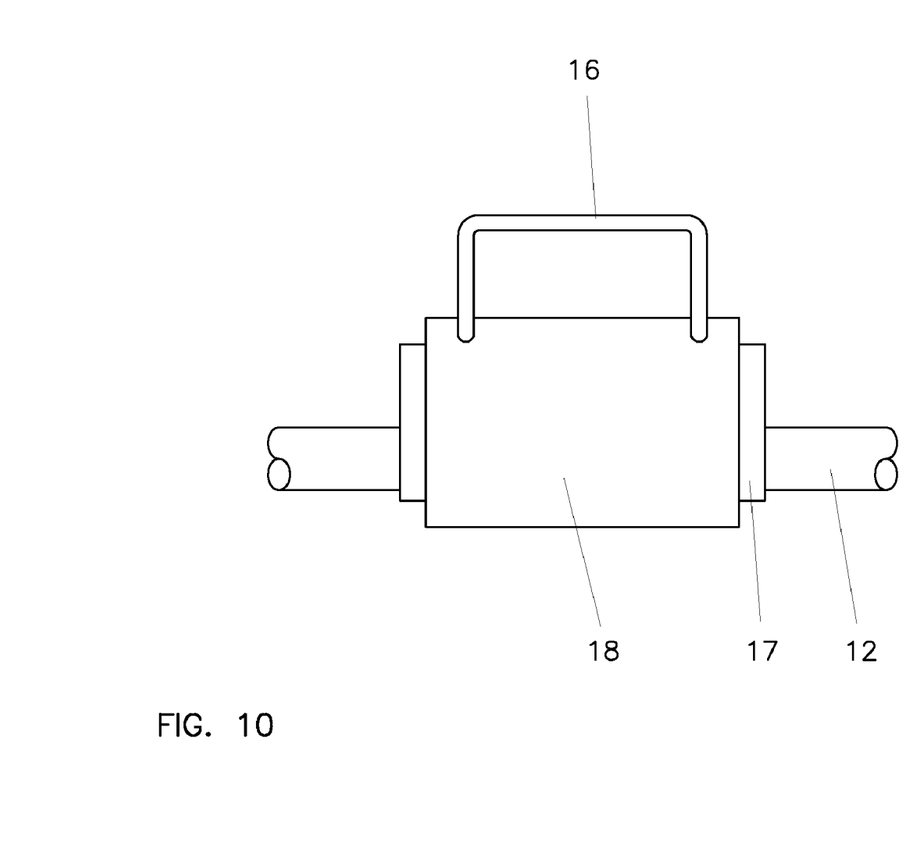
FIG. 10—front view detailing the eccentric of the lever shaft.
Figure 11:
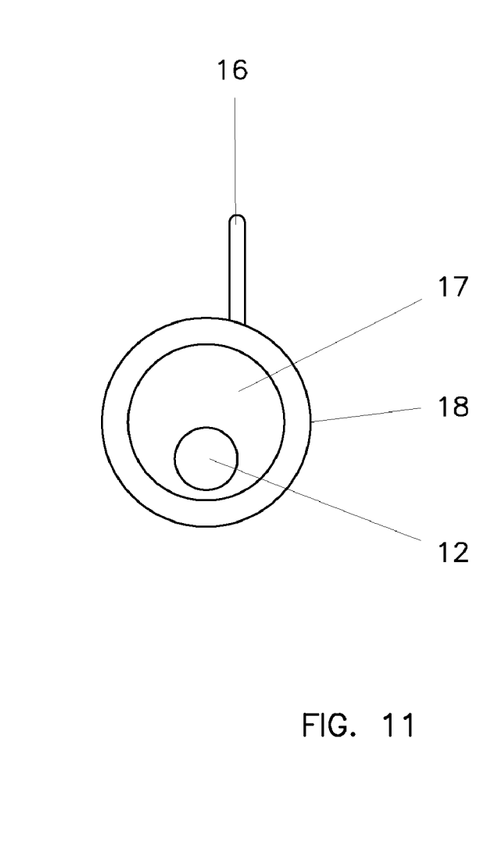
FIG. 11—side view detailing the eccentric of the lever shaft.

FIGS. 10 and 11 show in detail one of the eccentrics (17) which is not concentric to the shaft (12), and is enveloped in a plug (18) on which the ring (16) is welded that engages the hook (9) on the upper iron angle (6"). The plug (18) is mounted with no clearance around the eccentric (17), so that a relative movement between these parts occurs solely when the ring (16) encounters resistance to its movement, i.e., when it runs into the hook wall (9). Such mechanism allows the ring (16) to rotate and move upwards/downwards when the lever (15) is moved, allowing the ring (16) to reach the hook (9) and press it downwards, causing a great pressure of the upper iron angle (6") against the lower profile (10), which can be better seen in FIGS. 8 and 9.

Optionally, there may be a friction mechanism between the eccentric (17) and the plug (18), such as an inner sleeve of resilient material, preferably a polymeric or elastomeric material.

Also optionally, the shaft assembly (12) with the cams (17) may be replaced with a camshaft or crankshaft.

Figure 6:
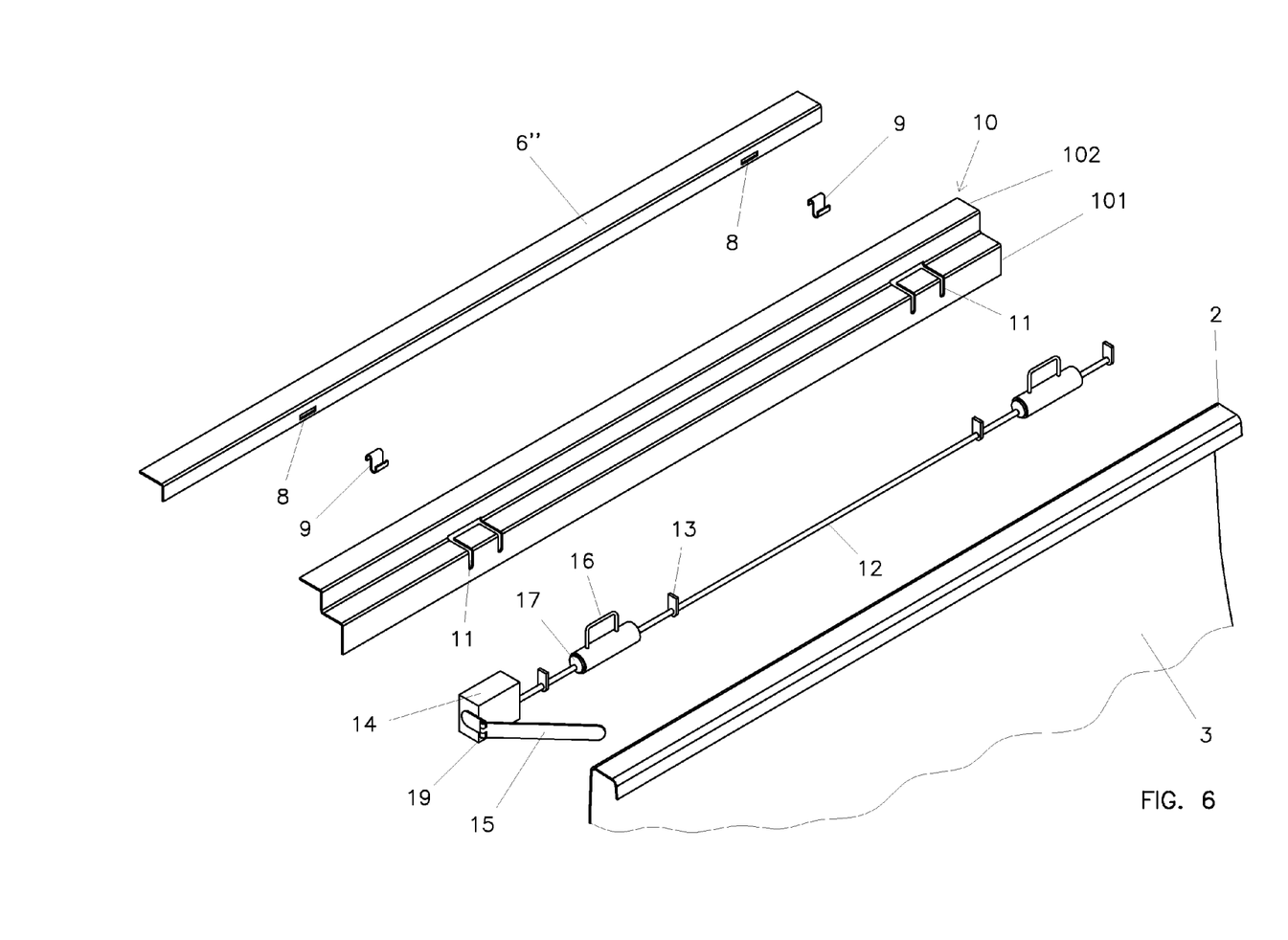
FIG. 6—exploded perspective of an option of the device with shaft and command lever.
Figure 7:
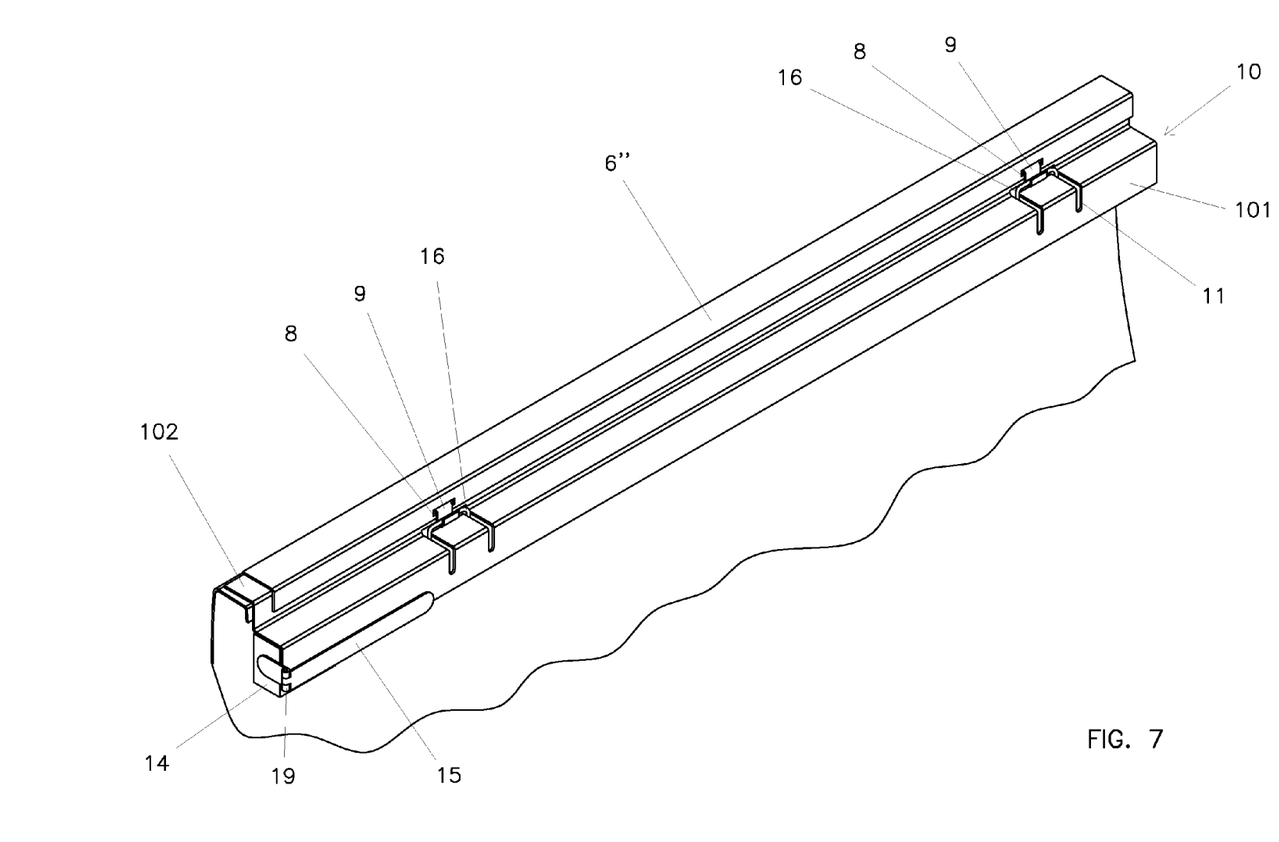
FIG. 7—perspective view of the device of the FIG. 6 mounted.
Figure 8:
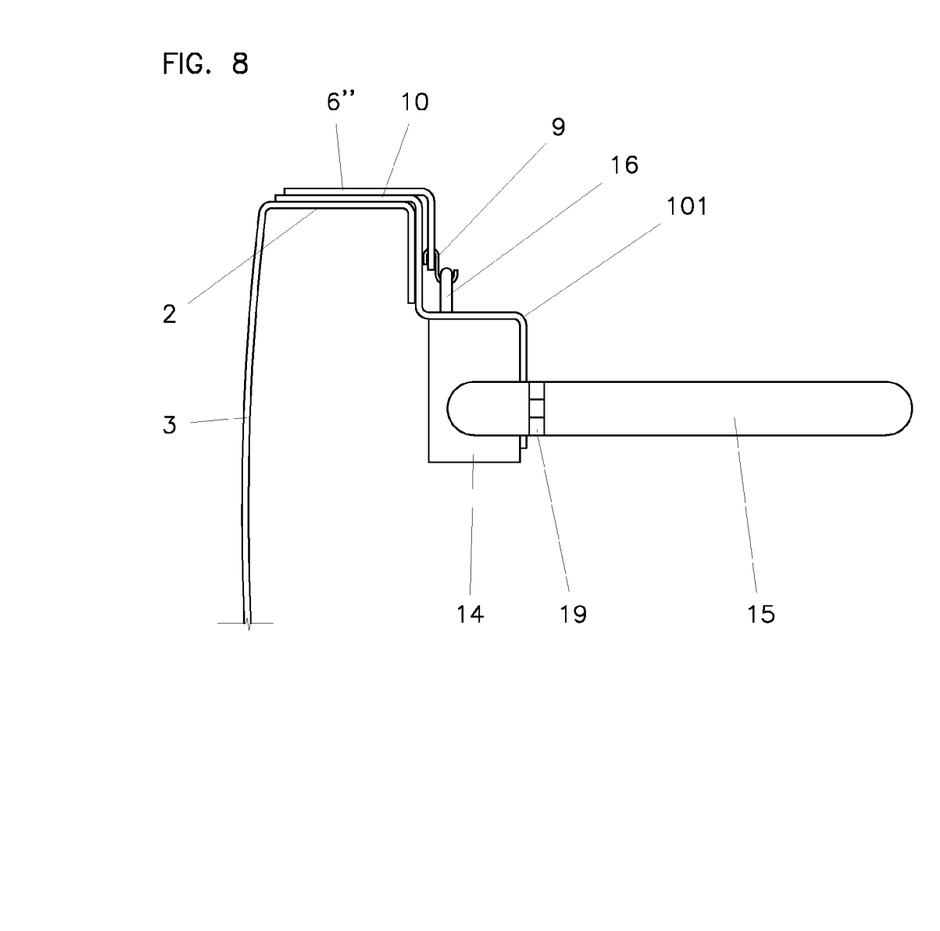
FIG. 8—side view of the device of the FIGS. 6 and 7 in the closed position.
Figure 9:
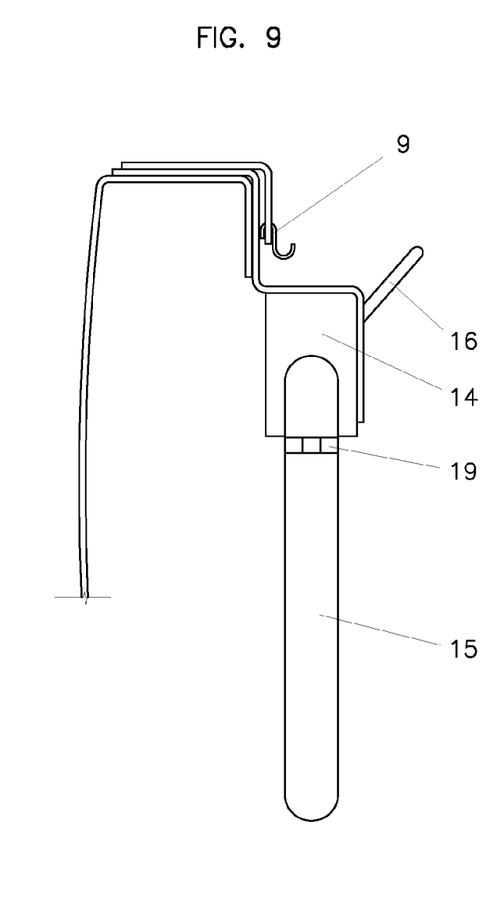
FIG. 9—side view of the device of the FIGS. 6 and 7 in the open position.
Figure 12:
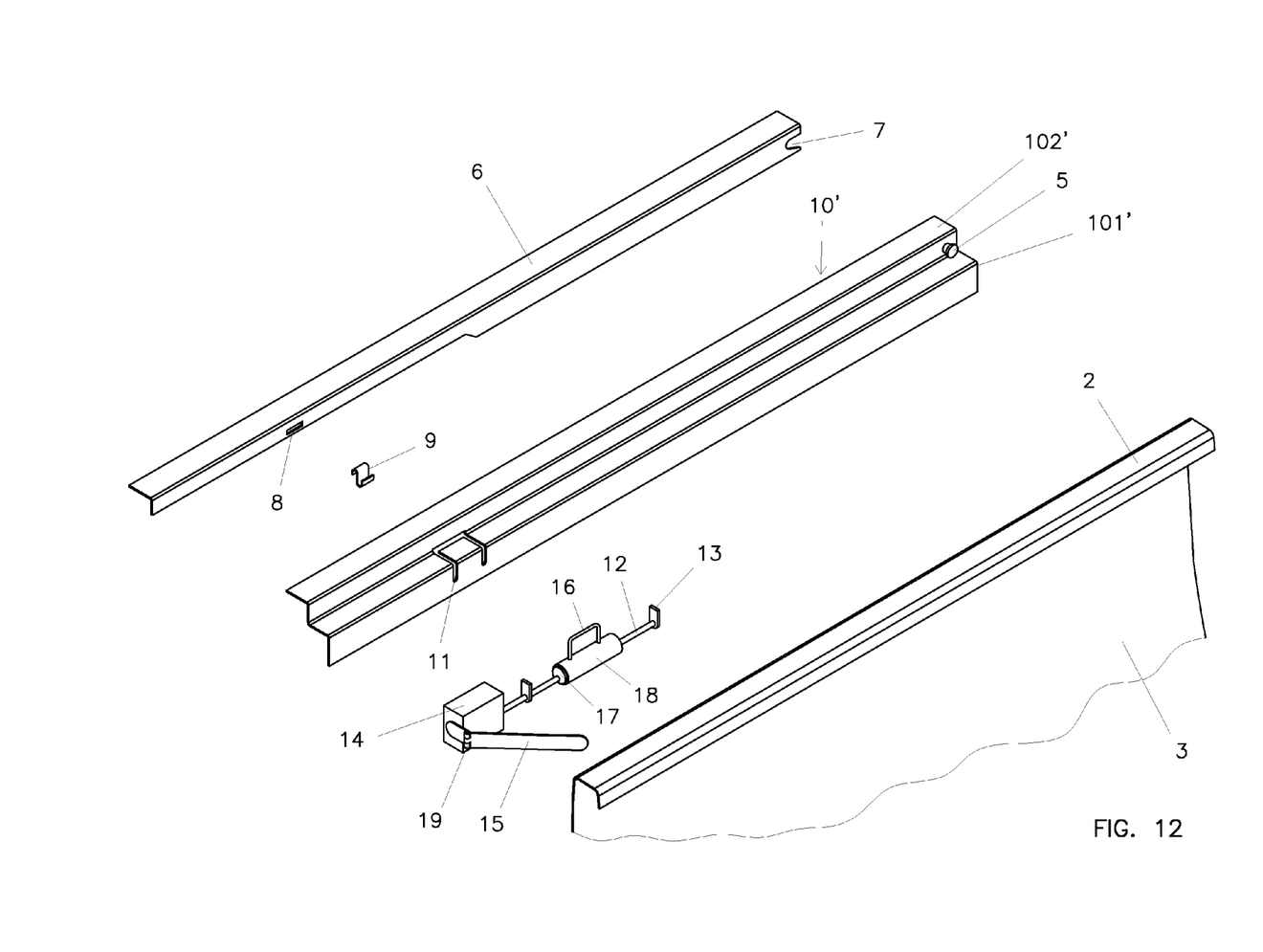
FIG. 12—exploded perspective of the option of the device in FIGS. 6 and 7, with a short shaft.

FIG. 12 shows a variant of the constructive option of the device for quick mounting of a truck top or equipment on a utility vehicle bed that is shown in FIGS. 6 and 7. In this option the shaft (12) is short, limited to one end of the lower profile (10') and possessing only one eccentric mechanism (17/18). The opposite portion of the lower profile (10') possesses a pin (5) for securing the cut (7) on the upper iron angle (6).

Figure 13:
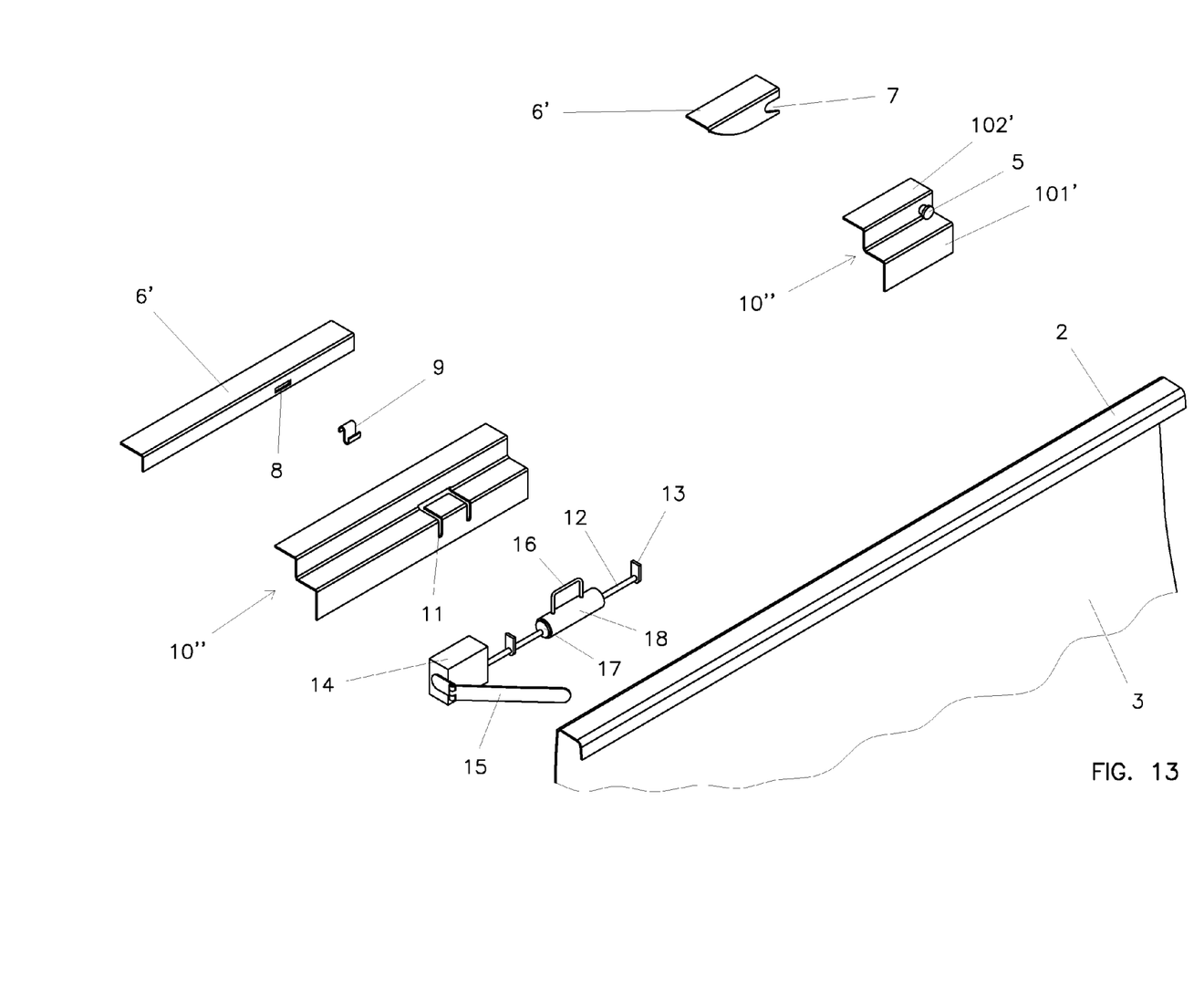
FIG. 13—exploded perspective of the option of the device in FIG. 12, with the iron angles sectioned.

FIG. 13 shows one other variant constructive choice of the device for quick mounting of a truck top or equipment on utility vehicle bed shown in FIGS. 6 and 7, wherein the shaft (12) is short and both the lower profile (10") and the upper iron angle (6') are segmented.

Figure 14:
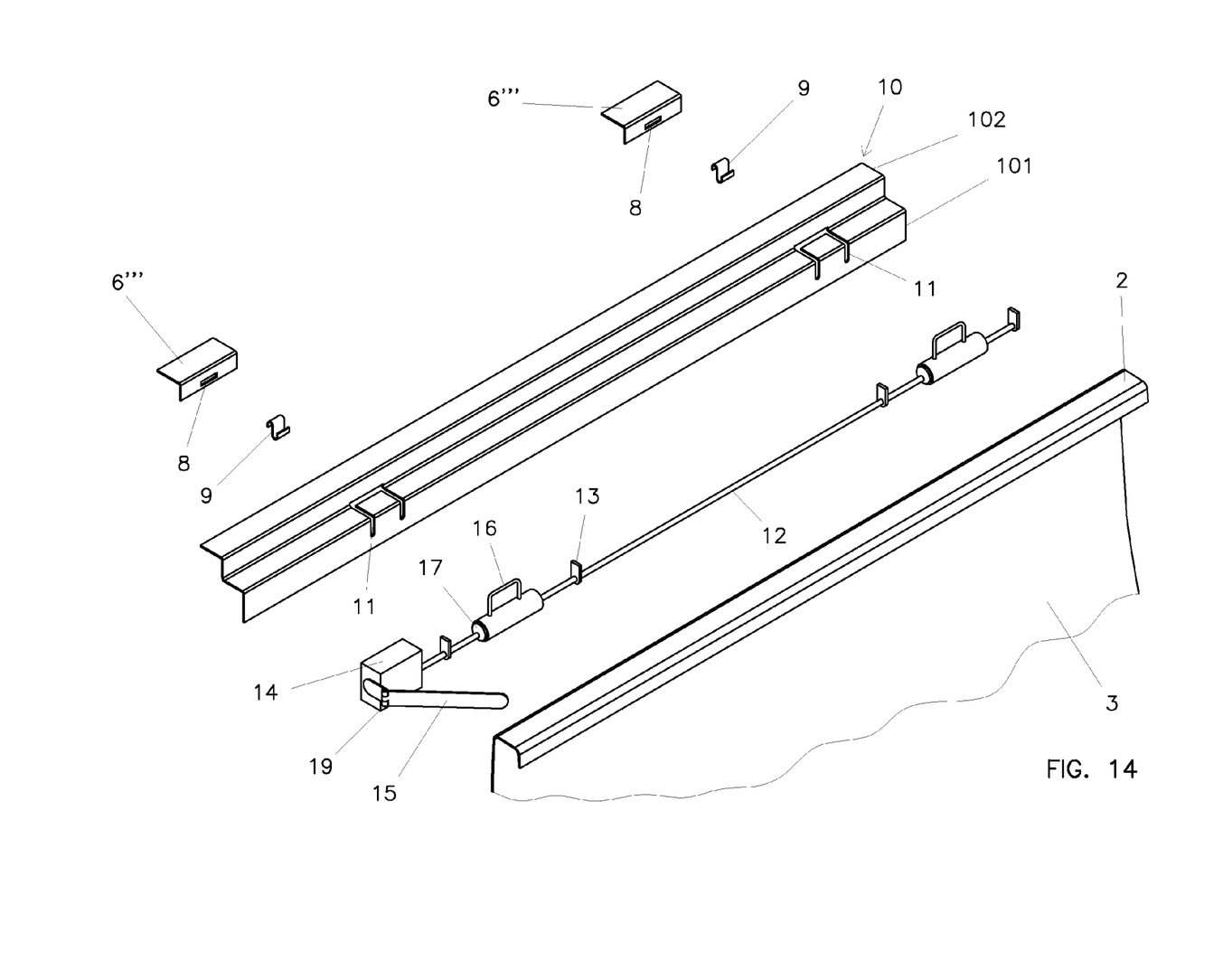
FIG. 14—exploded perspective of the option of the device in FIG. 6, with iron angles sectioned.

FIG. 14 shows yet another variant of the constructive choice of the device for quick mounting of a truck top or equipment on a utility vehicle bed shown in FIGS. 6 and 7, wherein the shaft (12) and the lower profile (10) are long and the upper iron angle (6") is sectioned and possesses slits (8) to engage the hooks (9).

The invention claimed is:

1. DEVICE FOR QUICK MOUNTING OF A TRUCK TOP OR EQUIPMENT ON AN UTILITY VEHICLE, comprising:
- a lower straight profile (10) with an "M" shaped cross section having a double iron angle, wherein a horizontal leg of a lower iron angle (101) is orthogonally joined to a vertical leg of an upper iron angle (102), and the lower straight profile (10) is adequately fastened over an upper leg (2) of a side wall of utility vehicle bed (3) by the upper iron angle (102) whereas the lower iron angle (101) includes "U" shaped slits (11) set apart from each other;
- an upper straight iron angle (6"), adequately fastened under the base of the truck top or equipment, which has slits (8) on a vertical wall thereof to engage hooks (9) that are positioned within the slits (8);
- a mechanism for securing the truck top or equipment which comprises a longitudinal shaft (12) equipped with bearings (13) located under the lower iron angle (101) of the lower straight profile (10), which rotates a fraction of a turn by the action of a gear box (14) operated by a lever (15), causing rings (16) that are coupled with eccentrics (17), with the eccentrics (17) positioned along the longitudinal shaft (12), with ring (16) to travel along the slits (11) on the lower straight profile (10) and couple with the hooks (9) positioned on the upper iron angle (6").

2. DEVICE FOR QUICK MOUNTING OF A TRUCK TOP OR EQUIPMENT ON AN UTILITY VEHICLE, according claim 1, wherein the eccentrics (17) are non-concentric to the shaft (12), and are enveloped in plugs (18) on which rings (16) are welded that engage the hooks (9) on the upper straight iron angle (6").

3. DEVICE FOR QUICK MOUNTING OF A TRUCK TOP OR EQUIPMENT ON AN UTILITY VEHICLE, according claim 1, wherein the shaft (12) is limited to one end of the lower profile (10') and with only one eccentric mechanism (17/18), whereas an opposite portion of the lower profile (10') includes a pin (5) for securing a cut (7) on the upper straight iron angle (6).

4. DEVICE FOR QUICK MOUNTING OF A TRUCK TOP OR EQUIPMENT ON AN UTILITY VEHICLE, according claim 3, wherein the lower profile (10") and the upper iron angle (6') are segmented.

5. DEVICE FOR QUICK MOUNTING OF A TRUCK TOP OR EQUIPMENT ON AN UTILITY VEHICLE, according claim 1, wherein the upper iron angle (6") is segmented.

* * * * *